Oct. 7, 1969     SEINAN MIYAKAWA     3,470,798
AUTOMATIC EXPOSURE CONTROL SYSTEM
Filed Sept. 14, 1966     2 Sheets-Sheet 1

INVENTOR.
SEINAN MIYAKAWA
BY Stanley Wolder
ATTORNEY

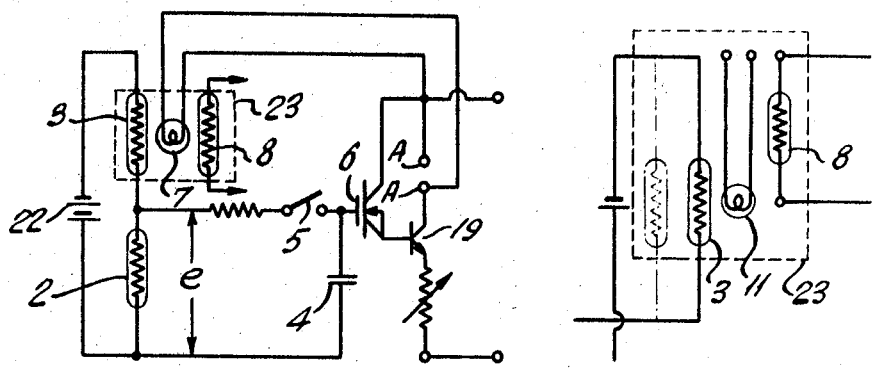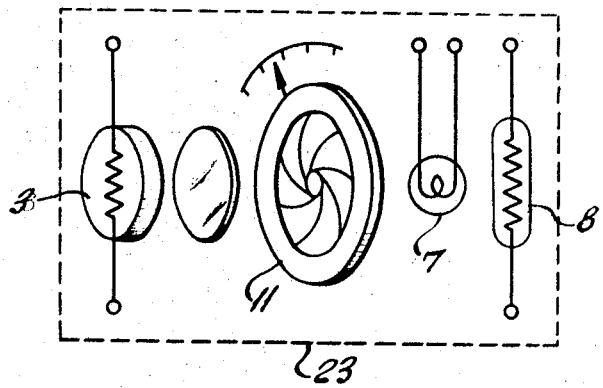

United States Patent Office 3,470,798
Patented Oct. 7, 1969

3,470,798
AUTOMATIC EXPOSURE CONTROL SYSTEM
Seinan Miyakawa, Tokyo-to, Japan, assignor to Asahi Kogaku Kogyo Kabushiki Kaisha, Itabashi-ku, Tokyo-to, Japan, a corporation of Japan
Filed Sept. 14, 1966, Ser. No. 579,384
Claims priority, application Japan, Sept. 27, 1965, 40/58,712; Feb. 3, 1966, 41/8,292
Int. Cl. G01j 1/16; G03b 7/08
U.S. Cl. 95—10                    9 Claims

ABSTRACT OF THE DISCLOSURE

A camera shutter timing network includes first and second photoresistors connected in series to a battery, the first photoresistor being exposed to camera incident light and the second photoresistor being exposed to a lamp. A first capacitor is connected across the first photoresistor and the input of a field effect transistor amplifier the output of which energizes the lamp so that inverse feedback is effected through the photoresistors. A third photoresistor is exposed to the lamp and is connected to a second capacitor to form a shutter timing circuit therewith.

---

The present invention relates generally to improvements in cameras and it relates particularly to an improved system for the automatic control of a camera shutter which system is highly suitable with through the lens light responsive elements.

There are two kinds of automatic exposure control arrangements for single lens reflex cameras, namely those of the external light receiving type and those of the internal light receiving or through the lens type (TTL system), depending upon the position of the light sensitive element relative to the camera body. In the former type the light sensitive element is positioned at the front of the camera where it detects the scene brightness by the light impinging upon it through a window arranged at the camera casing, while in the latter type the light sensitive element is positioned in the photographing light path or the viewfinder light path so as to measure the intensity of light which has passed through the objective.

The internal light receiving type is superior to the external light receiving type in that it permits the use of interchangeable lenses since it can perform accurate light measurement irrespective of a change of the photographing image angle while the latter's light measuring image angle is constant. In this internal light receiving type, however, during the shutter release operation, the light sensitive element must be withdrawn to where it does not obstruct the light reaching the film, or otherwise the light impinging upon the light sensitive element is blocked. Thus, it is necessary that during such preparatory operation as focusing, the scene brightness be measured and proper exposure value corresponding to such scene brightness be memorized.

In such memorizing devices of the exposure meter coupled type, the operation may be carried out in a comparatively simple manner, for example, by mechanically retaining the exposure meter indication corresponding to the scene brightness. However, in an automatic exposure control device which controls the exposure time by means of an electronic circuit, the operation is purely electrical so that the aforementioned mechanical memorizing method is not applicable. Thus, in an electro-magnetic shutter arrangement for automatic exposure control which controls the exposure time in a purely electrical manner, in adopting the arrangement for an internal light receiving system, the quality and properties of the aforementioned memorizing device are highly important.

It is, therefore, a principal object of the present invention to provide an improved automatic exposure camera.

Another object of the present invention is to provide an improved electronic system for automatically controlling a camera shutter exposure sequence in response to the incident light.

Still another object of the present invention is to provide an improved electronic network for measuring the light incident on a camera and memorizing an electrical quantity corresponding to said light and employing said measured electrical quantity for controlling the exposure time of the camera shutter.

A further object of the present invention is to provide an automatic shutter control highly useful with through the lens light measuring systems.

Still a further object of the present invention is to provide an electronic automatic shutter control of the above nature characterized by its ruggedness, simplicity, accuracy, reliability, versatility and low cost.

The above and other objects of the present invention will become apparent from a reading of the following description taken in conjunction with the accompanying drawings, wherein:

FIGURE 2 is the equivalent circuit diagram of the control network;

FIGURE 3 is a schematic view of a modified form of the coupling and feedback arrangement; and FIGURE 4 is a schematic and diagrammatic view of another form of coupling and feedback arrangement.

Figure 1:
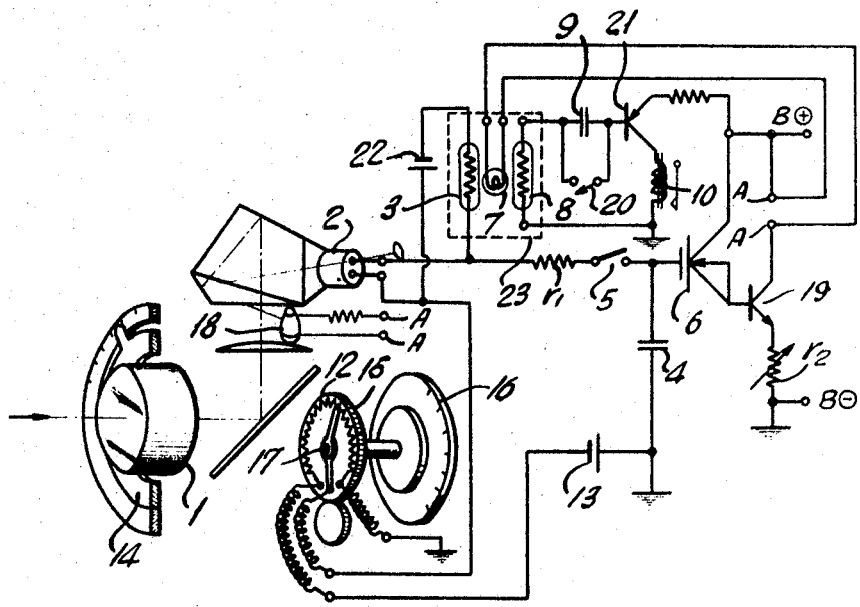
FIGURE 1 is a schematic and diagrammatic view of a camera embodying the present invention.

In a sense, the present invention contemplates an automatic exposure control system for a camera, including an electrically actuated shutter control device comprising an amplifier, including a field effect transistor having an input and an output, a first capacitor, means connecting said capacitor to said transistor input, means for charging said capacitor in response to the light incident on said camera, and timing means responsive to the output of said amplifier for actuating said shutter control means.

According to a preferred embodiment of the present invention, the control circuit is employed in a single lens reflex camera and includes a first photoresistor positioned in the path of light passing through the objective lens and is connected in series with a second photoresistor across a voltage source and through a switch and an adjustable voltage divider across the first capacitor. The amplifier output energizes a lamp which illuminates the second photoresistor to define a negative feedback loop. A third photoresistor is exposed to the lamp and forms part of an RC timing network, for controlling the closing of the camera shutter. The degree of exposure of at least one of the second and third photoresistors may be adjustable by means of an intervening adjustable diaphragm or by adjusting the relative positions of the lamp and the photoresistors.

Referring now to the drawings which show embodiments of the present invention, a first photoresistor or photoconductor element 2, composed for example of CdS, receives light rays P through the camera objective 1 from the scene to be photographed, and a second photoresistor or photoconductor element 3, composed for example of CdS, is connected in series with the photoconductor element 2, and a DC current source 22. A field effect transistor 6 is provided whose gate is connected through normally open switch 5 and, if necessary, a resistor $r_1$, to the junction point between said two photoconductor elements 2 and 3. The gate of the field effect transistor 6 is also connected through a capacitor 4 to the junction point between the first photoconductor element 2 and the + side of the current source 22. An electric lamp 7 is inserted in the load circuit of the field effect transistor 6 via an amplifying transistor 19 at such position as to be opposite to the second photoconductor element 3. An adjusting resistor $r_2$ is inserted in the emitter circuit of the transistor 19.

A time constant circuit is constituted by a third photoresistor or photoconductor 8 arranged adjacent to said lamp 7 and a capacitor 9 connected in series with said photoconductor 8. This time constant circuit controls the operation of an electro-magnetic system 10 which actuates the camera shutter closure operation. A light amount restricting member 11 (FIG. 4) such as a diaphragm is arranged in at least one of the light paths from the lamp 7 to the photoconductors 3 and 8. This member 11 is adjusted in accordance with the sensitivity value of the film used or the diaphragm value, or a value related to both of these values.

A potentiometer 12 serving as a voltage divider in relation to the voltage source battery 13 is arranged along the periphery of a disc 15 coupled to a diaphragm ring 14. A movable contact member or arm 17 coupled to a film sensitivity setting ring 16 cooperates with the potentiometer 12 so that an adjustable fraction of the voltage source battery 13, corresponding to the effective relative resistance values resulting from the relative movements of the disc 15 and the movable contact member 17, is applied to said photoconductor 2.

A voltmeter 18 is connected in parallel with the lamp 7 in the operative circuit as indicated by the reference characters A—A, and its pointer is so positioned as to appear near the image plane of the viewfinder light path. An amplifying transistor 19 has its base connected to the output of the field effect transistor 6. The lamp 7 is inserted in series connection in the collector-emitter circuit of said transistor 19. In parallel with the capacitor 9 there is arranged a short-circuiting switch 20 to be opened in a movement coupled to the shutter opening operation. A switching transistor 21 is so arranged as to be actuated sensing the voltage rise across said capacitor 9. The aforementioned electro-magnetic system 10 is inserted in series connection in the collector emitter circuit of said transistor 21. Shown further are DC current source input terminals B+ and B—, and a battery 22 serving as a current source for the photoconductive circuit. The photoconductors 3 and 8 and the lamp 7 are held in a light tight dark box 23.

In the arrangement as shown in FIG. 3, the photoconductor 3 is so arranged as to be displaceable within the dark box 23 so that the operator may adjust the distance between the photoconductor 3 and the lamp 7 in accordance with the film sensitivity value, the diaphragm value or the value related to both of these values, thereby performing the controlling operation effected by the voltage divider resistor 12 of FIG. 1. Such adjustment may also be effected by making the other photoconductor 8 displaceable.

In the embodiment as shown in FIG. 4, a light restricting member 11 such as an adjustable diaphragm 11 is arranged between the photoconductor 3 and the lamp 7. The aforementioned controlling operation may also be made by adjusting this light restricting member which may also be positioned between the lamp 7 and the photoconductor 8.

Referring now to the fundamental equivalent circuit as shown in FIG. 2, the operation of the above arrangement is as follows:

When the operative switch 5 is closed, a circuit is completed which comprises a photoconductive network containing the current source battery 22 and the photoconductors 2 and 3 and the capacitor 4. Now, the light which has issued from the scene to be photographed and impinges upon the first photoconductor 2 causes said photoconductor 2 to vary its resistance value in accordance with the light intensity. Thus, a voltage $e$, which is a fraction of the voltage of the battery 22 and which varies in accordance with the scene brightness, is developed across said photoconductor 2. This voltage $e$ is applied to the gate of the field effect transistor 6 as the gate bias voltage. In the load circuit of the field effect transistor there is connected, through the amplifying transistor 19, the lamp 7. A load current in proportion to said voltage $e$ flows through said lamp 7 and energizes and lights it. Thus the lamp 7 illuminates the photoconductors 3 and 8. Since the photoconductor 3 varies its resistance value in accordance with the light intensity, further influence due to this resistance variation is exerted upon the voltage $e$, thus:

$$e = \frac{R_2}{R_2 + R_3} \cdot E$$

where $R_2$ and $R_3$ are resistance values of the photoconductor 2 and 3 respectively, and E is the voltage of the current source battery 22.

Now, when the resistance value $R_3$ of the photoconductor 3 becomes smaller because of the lighting of the lamp 7, the voltage $e$ tends to become larger. Larger gate bias voltage $e$ decreases the drain current of the FET 6 so that the transistor 19, also decreases the current through said lamp 7. This decreases the light intensity of the lamp 7 and accordingly increases the resistance value $R_3$ of the photoconductor 3 so that the voltage $e$ is decreased. In similar manner, when the voltage $e$ tends to be decreased, the resulting effect of the circuit operates to increase the voltage $e$.

Thus, the voltage $e$ is under a negative feedback condition resulting from the lamp 7, the photoconductor 3 and the related circuit; and, as a result, the voltage $e$ finally settles down to a certain equilibrium point. This equilibrium point is shifted according to the scene brightness as sensed by the photo-conductor 2. Since the voltage $e$ is thus determined according to the scene brightness, the light intensity of said lamp 7 is also determined according to the scene brightness.

The photoconductor 8 is so arranged as to be illuminated by the lamp 7. With a time constant circuit utilizing the photo-resistance characteristic of the photoconductor 8 and a shutter controlling electro-magnetic relay circuit controlled by said time constant circuit, it is possible to perform the electric shutter operation in response to the scene brightness.

The exposure value memorizing operation is as follows: In the preparatory operation prior to shutter release the voltage $e$ is thus established in accordance with the scene brightness and the lamp brightness is determined accordingly. Then, the shutter is released to its open position and in synchronism with this the coupled operative switch 5 is opened. Thus, a voltage which is equal to the voltage $e$ immediately prior to the shutter release is retained during the shutter release operation by means of the capacitor 4, as the gate bias or signal voltage of the field effect transistor 6. Also, the current flowing through the lamp 7 is kept constant during the shutter release operation, so that the brightness of the lamp 7 is kept constant in accordance with the scene brightness. Thus, with the brightness of this lamp 7, automatic exposure value setting operation is effected in such a manner that the exposure control is made in accordance with the memorized scene brightness immediately before the shutter release.

In the arrangement as shown in FIG. 1 wherein the aforementioned exposure value memorizing arrangement is applied to a single lens reflex camera, the exposure control operation with consideration to such exposure factors as the sensitivity of the film used or the diaphragm value is carried out with variation of the gate bias voltage of the field effect transistor 6 according to such exposure factor values. In the circuit containing the photoconductors 2 and 3 there is provided a variable resistor 12 whose value is so varied in accordance with a value related to both said film sensitivity and the diaphragm value as to affect the resultant voltage $e$ and accordingly the gate bias voltage of the field effect transistor 6.

In the arrangement as shown in FIG. 3, for attaining the same purpose as described above, instead of said variable resistor 12, the distance between the photoconductor 3 and the lamp 7 is varied. Thus the negative feedback rate is varied to accordingly change the voltage $e$, that is, the gate bias voltage of the field effect transistor 6.

In the arrangement according to the present invention as shown in FIG. 4, a light amount restricting member 11 such as a diaphragm is arranged between the lamp 7 and the photoconductor 3. The member 11 is adjusted according to the sensitivity of the film used or diaphragm value or a value related to both of these so that the light amount incident upon the photoconductor 3 is varied in continuous manner. Thus, the negative feedback rate is adjusted to attain the same object as described above.

A field effect transistor has a very large input resistance so that with the switch 5 open, even if the field effect transistor load current flows the voltage across the capacitor 4 practically remains unchanged, and accordingly also the load current remains unchanged. It is for this reason that a field effect transistor is excellent in an information memorizing device for an electric shutter. In the present invention the information memorizing device is so constituted that the field effect transistor load current is converted into light and then the light impinges upon the third photoconductor element.

While there have been described and illustrated preferred embodiments of the present invention, it is apparent that numerous alterations, omissions and additions may be made without departing from the spirit thereof.

What is claimed is:

1. An automatic exposure control system for a camera including an electrically actuated shutter control device comprising an amplifier including a transistor having an input and an output, a first capacitor, means connecting said capacitor to said transistor input, means for charging said capacitor in response to the light incident on said camera, and timing means responsive to the output of said amplifier for actuating said shutter control means, said capacitor charging means comprising a voltage source, first and second photoresistors connected in series, means for connecting said series connected photoresistors across said voltage source, means for connecting one of said photoresistors across said first capacitor, said first photoresistor being exposed to said camera incident light, and a lamp energized in response to the output of said amplifier, said second photoresistor being exposed to said lamp to provide an inverse feedback signal to said amplified input.

2. An automatic exposure control system for a camera including an electrically actuated shutter control device comprising an amplifier including a field effect transistor having an input and an output, a first capacitor, means connecting said capacitor to said transistor input, means for charging said capacitor in response to the light incident on said camera, and timing means responsive to the output of said amplifier for actuating said shutter control means, said capacitor charging means including a voltage source, first and second photoresistors connected in series, means for connecting said series connected photoresistors across said voltage source, means for connecting one of said photoresistors across said first capacitor, said first photoresistor being exposed to said camera incident light, and a lamp energized in response to the output of said amplifier, said second photoresistor being exposed to said lamp to provide an inverse feedback signal to said amplifier input, and said timing means includes a third photoresistor exposed to said lamp and a second capacitor coupled to said third photoresistor to define a network having a time constant responsive to the light incident on said third photoresistor.

3. The control system of claim 2 including means for applying an adjustable bias to said transistor input.

4. The control system of claim 2 wherein said camera includes an adjustable diaphragm and comprising means for applying an adjustable bias to said transistor input including a potentiometer, means for connecting the arm of said potentiometer to said transistor input and means coupled to said diaphragm for adjusting said potentiometer.

5. The control system of claim 2 wherein said camera includes an adjustable diaphragm and comprising means for applying an adjustable bias to said transistor input including a potentiometer, means for connecting the arm of said potentiometer to said transistor input, means coupled to said diaphragm for adjusting said potentiometer, and means for adjusting said potentiometer independently of said diaphragm.

6. The control system of claim 2 wherein the degree of exposure of at least one of said second and third photoresistors to said lamp is adjustable.

7. The control system of claim 2 including an adjustable diaphragm positioned between said lamp and at least one of said second and third photoresistors.

8. The control system of claim 2 including a current meter connected across said lamp.

9. The control system of claim 2 wherein said camera is a single lens reflex camera including an objective lens and said first photoresistor is exposed to the light passing through said objective lens.

References Cited

UNITED STATES PATENTS

| 3,205,799 | 9/1965 | Burearella et al. | 95—10 |
| 3,336,850 | 8/1967 | Otani et al. | 95—10 |

NORTON ANSHER, Primary Examiner

R. L. MOSES, Assistant Examiner